United States Patent

[11] 3,557,980

[72] Inventor Kaspar Klaus
    46, Schlacthofstrasse 894, Memmingen, Germany
[21] Appl. No. 880,499
[22] Filed Dec. 11, 1969
[45] Patented Jan. 26, 1971
    Continuation of application Ser. No. 754279, Aug. 21, 1968, now abandoned.

[54] VEHICLE FOR TRANSPORTING LOADS
    2 Claims, 4 Drawing Figs.
[52] U.S. Cl. .................................................. 214/77, 280/34
[51] Int. Cl. ................................................. B60p 1/48
[50] Field of Search ........................................... 280/34, 34.1, 150C, 150.5, 404, 415; 214/77, 70

[56] References Cited
    UNITED STATES PATENTS

| | | | |
|---|---|---|---|
| 2,996,206 | 8/1961 | KcKee | 280/34 |
| 3,087,744 | 4/1963 | Tanenbaum | 280/404 |
| 3,484,003 | 12/1969 | Strandberg et al. | 214/77 |
| 2,727,758 | 12/1955 | Smith | 280/34 |
| 2,929,524 | 3/1960 | Carlson | 280/150 |
| 2,996,206 | 8/1961 | McKee | 280/34 |
| 3,021,155 | 2/1962 | Sherman | 280/34 |
| 3,087,744 | 4/1963 | Tanenbaum | 280/404 |
| 3,262,582 | 7/1966 | Pitman | 280/150.5 |

FOREIGN PATENTS

| | | | |
|---|---|---|---|
| 1,084,747 | 1/1955 | France | 280/34 |

*Primary Examiner*—Leo Friaglia
*Assistant Examiner*—Robert R. Song
*Attorney*—Holman, Glascock, Downing and Seebold

ABSTRACT: A vehicle, such as an articulated truck for transporting loads and more especially large loads such as containers in which the frame or chassis of the semitrailer is defined by a number of components which are telescopically adjustable and lockable to allow for different sized containers. The foremost and rearmost components are provided with lifting devices.

PATENTED JAN 26 1971　　　　　　3,557,980
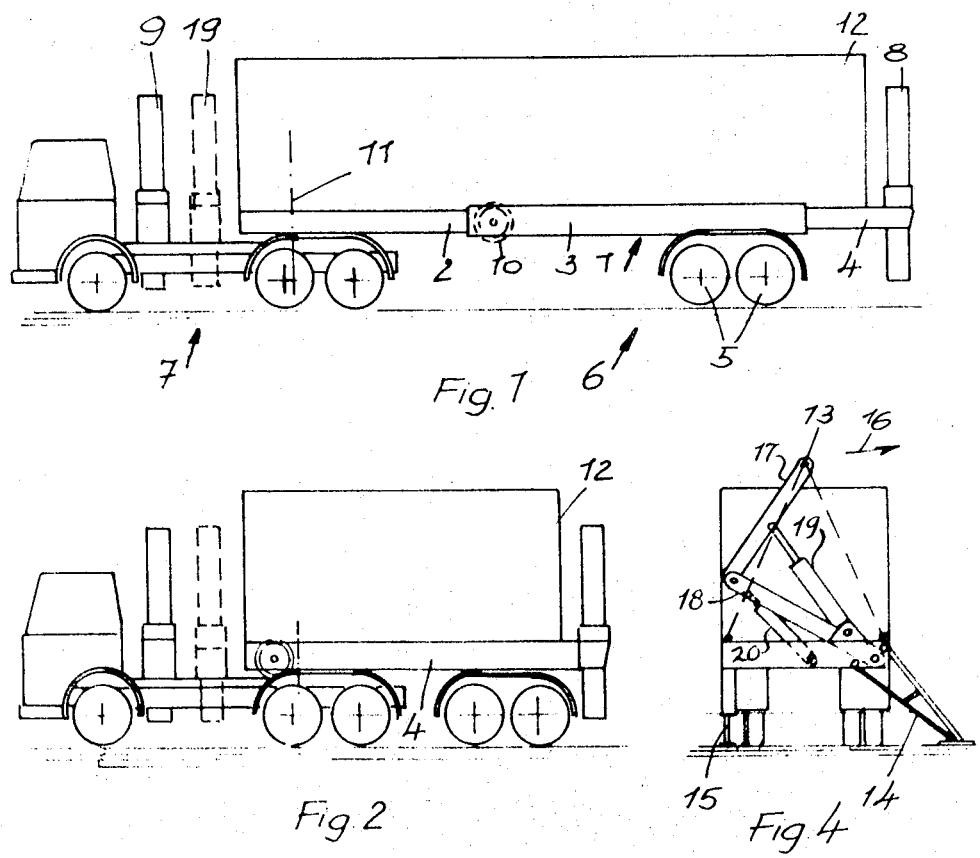
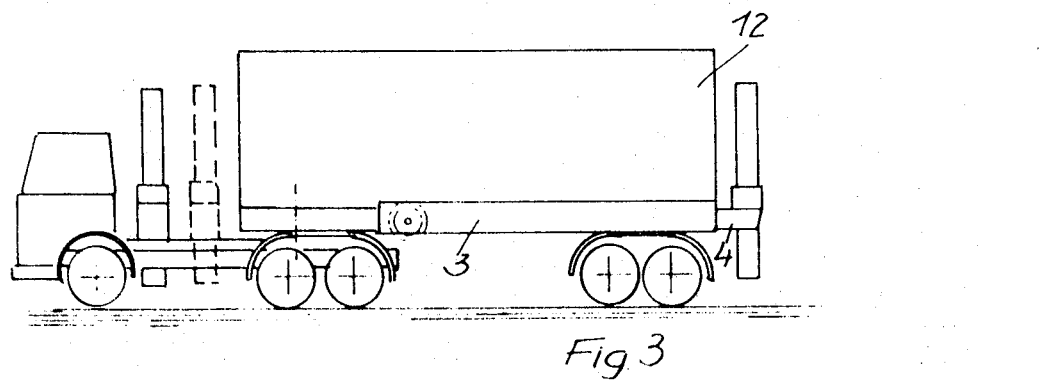

VEHICLE FOR TRANSPORTING LOADS

This application is a continuation of copending application Ser. No. 754,279 filed Aug. 21, 1968 and now abandoned.

BACKGROUND OF THE INVENTION

The present invention relates to a vehicle for transporting loads, particularly large loads, and more especially containers.

Large containers of similar height and width but different lengths are commonly carried on ships, railway vehicles, and also on road vehicles. When such containers are carried by road, they are normally transported on articulated vehicles, such as lorries. Containers of the type referred to can be of widely varying size, and are frequently found to have certain standard lengths, such as 20 feet, 30 feet, or 40 feet. Some containers are also known which have a length of 10 feet.

Difficulty has been experienced in the past when it has been desired to transport loads of different size on the same vehicle at different times. For example, when a container having a length of 20 feet has been carried on a semitrailer intended for carrying a container having a length of 40 feet, not only has there been a waste of space as regards the area of the semitrailer, but also problems have arisen in connection with loading and unloading the container by means of loading devices mounted on the vehicle. This has been the case since the ropes, chains or other members employed in lifting the container have had to assume oblique angles between the loading devices and the container. This has subjected both the ropes or chains, and the loading devices, to excessive strain. Furthermore, small containers having very heavy contents have subjected the frame of a semitrailer to an excessive load, since the load has not been applied uniformly to the area of the semitrailer.

SUMMARY OF THE INVENTION

According to the present invention, there is provided a vehicle for transporting loads, which includes a plurality of relatively movable components so disposed that the length of the vehicle and the components being capable of being locked plurality.

Preferably, the components are mounted for telescopic movement with respect to one another, in both directions along the length of the vehicle and a driving device, such as a hydraulically operated piston and cylinder arrangement, is provided for displacing one or more of the components to change its length. Moreover, loading devices incorporating supporting feet are preferably provided, so that loads may conveniently be loaded onto and unloaded from the vehicle.

Suitably, a vehicle of the invention comprises a semitrailer for use with an articulated lorry, in which the forward loading device is mounted on the driving portion of the lorry and is movable between two positions, with the device being in its forward position, spaced from a load on the semitrailer when the lorry is being driven, and in a position further back and closer to the load during operation of the loading devices.

The present vehicle normally includes hydraulic lines and/or electrical wiring, and means for accommodating any slack in the hydraulic lines and/or electrical wiring, in response to changes in the length of the vehicle.

A semitrailer embodying the invention conveniently consists of three relatively movable components with only the slack accommodating means being mounted on the central run of the three components.

In one embodiment of a vehicle having three components, the maximum possible displacement between the front and central components is an integral multiple of the maximum possible displacement between the central and rear components. For example, the maximum possible displacements between the front and central components and between the central and rear components may be arranged to be 4.5 meters and 1.5 meters respectively. This arrangement is advantageous as regards negotiating curves, and the swinging out of the end of the semitrailer beyond the wheel track is slight. This is also true of the region of the semitrailer between the axles or pairs of axles supporting the semitrailer.

Instead of providing a hydraulic driving device for controlling the displacements of the components of the vehicle, it is possible to use a system of ropes for this purpose.

The device for accommodating any slack arising in the hydraulic lines or electrical wiring of the vehicle as a result of any changes in the length of the vehicle may be a winding drum. It is also possible to construct the conduits per se in a telescopic fashion, or to arrange the same in a zigzag or pulley-block manner.

In order that the present invention may more readily be understood, the following description is given, merely by way of example, reference being made to the accompanying drawing in which:

BRIEF DESCRIPTION OF THE DRAWINGS

FIG. 1 is an elevational view illustrating an articulated lorry including a semitrailer embodying the invention;

FIGS. 2 and 3 are elevational views illustrating additional operating conditions of the semitrailer shown in FIG. 1; and FIG. 4 is a rear elevational view of the semitrailer shown in FIGS. 1 to 3, during a loading operation.

DETAILED DESCRIPTION OF THE INVENTION

Referring now in detail to the drawing, FIG. 1 shows an articulated lorry having a driving portion 7 connected to a semitrailer 6. The semitrailer 6 includes a frame 1 defined by three components 2, 3 and 4. The front frame component 2 is supported by the driving portion 7, by a coupling between the driving portion and the semitrailer. This coupling is not shown in detail in the drawing, but its pivoting axis as designated is 11.

The central frame component 3 has mounted thereon sets of wheels 5. The rear frame component 4 has mounted thereon a rear loading device 8, and a further loading device 9 of substantially the same construction is provided for the driving portion 7. The forward loading device 9 is preferably arranged to be displaceable in order to ensure the necessary free space in front of the forward end of the semitrailer during travel. During a loading operation, the loading device 9 may be displaced into a position 19 shown in broken lines in the drawing.

Mounted on the central frame component 3 is a drum 10 on which are wound the hydraulic lines and electrical wiring extending between the rear frame component 4 of the semitrailer to the front frame component 2 and to the driving portion 7.

The frame components 2, 3 and 4 of the semitrailer 6 are so arranged that the front and rear components 2 and 4 respectively can be received telescopically into the front and rear ends of the central frame component 3. In FIG. 1 the semitrailer is shown in its fully extended condition, i.e. in the condition necessary for carrying loads such as containers of the maximum length that the semitrailer is capable of transporting, for example 40 feet. FIG. 2 shows the same semitrailer when the frame components 2, 3 and 4 have been telescoped to the shortest condition, intended for a load having a length of 20 feet. In FIG. 3 shown the semitrailer is illustrated in an intermediate condition suitable for transporting a load having a length of 30 feet.

FIG. 4 shows the rear loading device 8 as seen from the rear of the semitrailer. The device 8 is constructed as a double link arrangement, including upper link 17 pivoted to a lower link 18 which in turn is pivoted to the rear component 4. An hydraulically operated piston cylinder unit 19 extends from the base of the lower link to a point intermediate the ends of the upper link 17 to raise and lower the upper link. A second similar hydraulic unit 20 extends between the rear component and the lower link 18 to actuate the latter. A load can be suspended from point 13. A supporting foot 14 is provided on the off-loading side of the semitrailer, and the foot 14 engages the ground surface to stabilize the semitrailer during a loading or unloading operation. A further supporting foot 15 extending vertically downwards from the frame of the semitrailer is provided on the opposite side of the vehicle. Both supporting feet 14 and 15 are so constructed as to be retractable. The direction of movement of the point 13 during an unloading operation is designated by an arrow 16.

I claim:

1. In a road vehicle for transporting large loads and more particularly containers, a wheeled tractive power source and a semitrailer operably related to the wheeled tractive power source for supporting a load, said semitrailer including at least a first frame component and a second frame component, means mounting the first frame component on said wheeled tractive power source for swinging movement about a vertical axis, ground wheels mounted on said first frame component, said second frame component being carried by said first frame component, a first loading and unloading device mounted on the wheeled tractive power source in front of the load, a second loading and unloading device mounted on said second frame component behind the load, and means cooperable with said first and second frame components to permit displacement of said components longitudinally relative to each other for varying the distance between said first and second device to accommodate the length of the particular load to be transported.

2. In a road vehicle for transporting large loads and more particularly containers, a wheeled tractive power source and a semitrailer operably related to the wheeled tractive power source, said semitrailer including a frame defined by a front, central and rear components, means mounting the front component on the wheeled tractive power source for pivotal movement about a vertical axis, ground wheels mounted on the central component, a first loading and unloading device mounted on the wheeled tractive power source in front of the load on the semitrailer, a second loading and unloading device mounted on the rear component behind the load, said front and rear components being telescopically mounted in said central component for adjusting the length of the frame to accommodate the length of the particular load to be transported and said first loading and unloading device being adjustable longitudinally of the wheeled tractive power source toward and away from the front of the load.